United States Patent
Bayer et al.

[11] 3,986,975
[45] Oct. 19, 1976

[54] PROCESS FOR CONTINUOUS PRODUCTION OF FLOCCULATING AGENT FROM RED MUD

[75] Inventors: Gerhard Bayer, Ludwigshafen (Rhine); Egon Cherdron, Limburgerhof, Pfalz, both of Germany

[73] Assignee: Gebr. Giulini GmbH, Ludwigshafen (Rhine), Germany

[22] Filed: Aug. 22, 1973

[21] Appl. No.: 390,334

[30] Foreign Application Priority Data
Aug. 31, 1972  Germany.......................... 2242811

[52] U.S. Cl................................. 252/175; 159/9 A; 210/10
[51] Int. Cl.²........................................ C02B 1/20
[58] Field of Search............ 252/175; 159/4 F, 9 A; 210/42, 47, 10

[56] References Cited
UNITED STATES PATENTS
1,197,123   9/1916   Hoover ................................ 210/47

FOREIGN PATENTS OR APPLICATIONS
1,592,104   5/1912   Germany

*Primary Examiner*—Mayer Weinblatt
*Assistant Examiner*—Edith R. Buffalow
*Attorney, Agent, or Firm*—Spencer & Kaye

[57] ABSTRACT

Red mud from the production of alumina from bauxite by the Bayer process is converted to a flocculating agent by reaction with sulfuric acid and drying the reaction product by direct heat transfer thereto by contact with hot solid bodies and by contact with hot gases. The resulting solid product is a mixture of water-soluble sulfates of iron and aluminum with minor proportions of other water-soluble metal sulfates in the form of free-flowing discrete particles.

12 Claims, 1 Drawing Figure

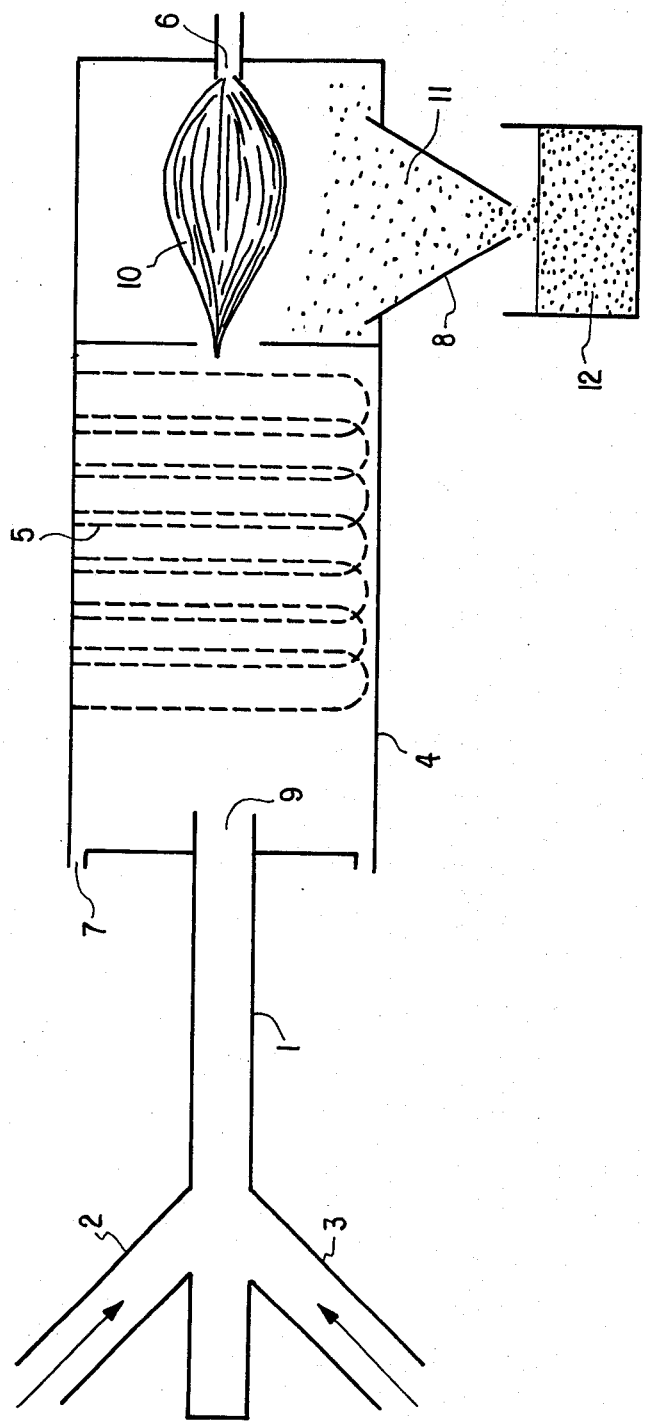

PROCESS FOR CONTINUOUS PRODUCTION OF FLOCCULATING AGENT FROM RED MUD

BACKGROUND OF THE INVENTION

This invention relates to the conversion of a waste product from the aluminum industry into a material which has substantial economic value.

In the production of alumina by the Bayer process, up to two tons of a filter-wet residue having a water content of from 40 to 50% by weight may be obtained for every ton of alumina produced, and it has been estimated that more than 5 million tons of such residue accumulate annually.

A general description of the Bayer alumina process may be found in the MCGRAW-HILL ENCYCLOPEDIA OF SCIENCE AND TECHNOLOGY, McGraw-Hill Book Co., N.Y. (1966), Vol. 1, pages 290–292, under the heading "Alumina Extraction." Briefly, this is a continuous process wherein the bauxite ore is extracted with a leaching liquor containing 280g NaO per liter at a temperature of about 180° C and a pressure in the order of 8 atmospheres. The insoluble residue is separated from the crude extract, usually on a rotary drum filter.

This residue is a deeply-colored clay-like substance which is highly hydrated (about 35–50% water by weight), the mineral content of which is principally compounds of iron and aluminum with lesser proportions of alkalis and compounds of other metals. Because of its color and consistency, this material is commonly referred to as "red mud."

The proportions of the mineral components in red mud vary somewhat with the particular bauxite ore from which it is derived. The following Table, based upon analyses of red muds dried at 105° C, is indicative of these compositional variations.

Table 1

| | | |
|---|---|---|
| $Al_2O_3$ | 15 – 25 | (% by weight) |
| $Fe_2O_3$ | 20 – 55 | " |
| $TiO_2$ | 5 – 10 | " |
| $SiO_2$ | 8 – 12 | " |
| $CaO$ | 1 – 4 | " |
| $Na_2O$ | 5 – 12 | " |
| loss at red heat | 7 – 10 | " |

The substantial amounts of such residue from the production of alumina has posed a substantial ecological as well as an economic problem for many years and various proposals have been made for the industrial utilization of this otherwise waste product, none of which have proven satisfactory.

One such proposal is represented by DAS (German Published Patent Application) No. 1,592,104 according to which red mud is partially decomposed by treating with 60-96% aqueous sulfuric acid in less than stoichiometric quantities, calculated with respect to the metal oxides in the mud. It is suggested that such a product can be used in various fields, for example in the treatment of raw water and various industrial waste waters and, particularly in combination with humus fertilizer and ammonium sulfate or other fertilizers, for improving the structure of the soil.

The method of DAS No. 1,592,104 is not suitable, however, for the manufacture of flocculating agents on an industrial scale. For example, the moisture content of the red mud must be reduced to about 10–20% before the acid treatment, as otherwise the reaction product is not dry enough for satisfactory storage. Moreover, the predried red mud must be finely ground with concomitant production of considerable dust which is objectionable to the workers and the surrounding community. In addition, the dried and ground red mud is difficult to meter out accurately and even with highly efficient mixers it does not mix completely and uniformly with the sulfuric acid.

A further drawback is that the reaction mixture is initially in a pasty state and must be transferred to special equipment for cooling to a solid product which is suitable for crushing and grinding to the required grain size. During grinding, additional difficulties arise because the reaction product tends to stick to the grinding machinery. This same problem occurs during the screening of the ground material.

These problems obviously not only complicate large scale operations according to DAS No. 1,592,104 but substantially add to the operating costs for labor and equipment.

SUMMARY OF THE INVENTION

It is an object of the present invention to provide a method for producing flocculants by reacting red mud with sulfuric acid without the above-mentioned drawbacks. It is a further object to produce flocculating agents from red mud in a large-scale operation which is relatively simple and at a reasonable cost.

These and other objects which will become apparent in the description which follows and the accompanying drawing are achieved, according to the present invention, by a procedure wherein red mud from the Bayer process is converted to a flocculating agent by reaction with sulfuric acid and drying the reaction mass by direct heat transfer thereto by contact with hot solid bodies and by contact with hot gases.

BRIEF DESCRIPTION OF THE DRAWING

The accompanying drawing shows more-or-less diagrammatically apparatus for carrying out the above-described method, wherein red mud and sulfuric acid are supplied to the mixing chamber 1 through reactant inlets 2 and 3 respectively, the resulting slurry passes into drying kiln 4 and the dried reaction product is discharged through outlet 8 and so collected in container 12.

DESCRIPTION OF THE PREFERRED EMBODIMENTS

Applicants have discovered that a product particularly suitable for use as a flocculating agent in water purification can be prepared readily and simply by reaction of red mud with aqueous sulfuric acid having $H_2SO_4$ content of more than 60% and preferably in the range 80–96% and drying the reaction product with agitation and in conductive heat exchange with both hot solid bodies and hot gases. The relative proportions of the acid and the mud are so selected that the pH of the reaction mixture lies between 1.5 and 2.5, preferably between 1.8 and 2.1.

An excess of sulfuric acid over that required to convert all the metal oxides in the red mud to the corresponding sulfates is not used. The amount of introduced sulfuric acid is substoechiometric, so that free acid in the reaction product is not present. The reaction product contains acid and neutral metal sulfates and unfused (undissolved) residues. If the pH of the reaction mixture lies between 1.5 and 2.5, the proportions of the acid metal sulfates, neutral metal sulfates and unfused residues are so, the reaction product is finegrained and free-flowing and not hygroscopic.

A suitable means for effecting the desired agitation and conductive heat transfer in drying the reaction mixture is a hanging-chain rotary kiln such as is shown and described at pages 20–22 of *Perry's Chemical Engineers' Handbook*, 4th Edition, McGraw-Hill Book Co., New York, N.Y. (1963).

Another feature of this invention is that the mixer-inlet means requires no special design and a simple tubular flow pipe is satisfactory.

A significant aspect of the present invention is that the red mud is continuously processed in the simplest manner and without necessity for large-size equipment. A preparatory drying and grinding of the red mud is no longer necessary, thereby substantially reducing direct and overhead costs. The red mud can thus be metered directly into the apparatus together with the sulfuric acid as it becomes available during operation of the Bayer process, or with only intermediate storage for more efficient material flow. With no further treatment than cooling, the reaction product is in condition for distribution and use in the water treatment art. The material obtained according to the present invention is characterized by a higher content of active substances, better homogeneity and improved meterability than the red mud conversion product heretofore available commercially.

Referring now to the drawing, the flow pipe 1 is of acid-resistant steel or other suitable material, and the red mud slurry is fed thereto through line 2, at a predetermined rate by pumping and metering means not shown, with the sulfuric acid being fed through line 3, likewise by pumping and metering means not shown.

The heat of mixing and reaction generates considerable water vapor which serves to eject the reaction mixture into the drying means 4, through inlet 9. The dryer is preferably a rotary kiln provided with hanging chains 5 and a combustion device or other means 6 for supplying a stream of hot gases 10 which provide the heat for evaporating the water in the reaction mass. These gases, along with water vapor from drying the reaction mass, are discharged through outlet 7 at the opposite end of the kiln. The temperature in the kiln will be in the range 120°–180° C, and preferably 130°–150° C.

As the reaction mixtures passes through kiln 4, the water is evaporated therefrom and the solid reaction products are dried and comminuted by the resulting agitation and contact with the hot chains and hot gases. This material 11 is discharged from the kiln through solids outlet 8 and is collected in container 12.

The chains 5 thus serve to agitate the reaction mass to prevent caking thereof on the kiln wall, as well as to assist in the heat transfer. During movement through the hot rotating drum, the solid reaction products are reduced to discrete dry particles which are especially suitable for treating of raw and waste water. The size of this particular material can be controlled from granular to pulverulent by appropriately regulating the speed of rotation of the drum and associated heating elements. The process and equipment are particularly suited for continuous operation, and the discharge of the dried and comminuted products also takes place continuously.

The reaction between the red mud and the sulfuric acid starts immediately upon the mixing and, depending upon the feed rate and the length of chamber 1, the reaction may be entirely or partially completed by the time the reaction mixture passes into the dryer 4. If any unreacted red mud passes into dryer 4, conversion will be completed therein.

Instead of countercurrent heating as indicated, the reaction mass may also be heated with the gases flowing concurrently therewith during its passage through the drier.

EXAMPLE I

In a plant including a mixing means and a hanging-chain rotary kiln of the type indicated in the accompanying drawing 8.2 tons of red mud were reacted per hour with 5.5 tons of 9.6% sulfuric acid.

The heat of this reaction raised the temperature of the reaction mass to 140°–150° C, with consequent evaporation of most of the water. During passage through the hot kiln, the remainder of the water was evaporated and the reaction mass comminuted. An average of 10 tons solid product per hour was recovered. The temperature in the dryer 4 was 140° C and the pH of reaction mixture 2.0.

The composition of the red mud was as follows:

RED MUD

| | | |
|---|---|---|
| $H_2O$ | 45 % | (by weight) |
| $Al_2O_3$ | 13.7% | " |
| $Fe_2O_3$ | 13.5% | " |
| $TiO_2$ | 4.4% | " |
| $Na_2O$ | 6.0% | " |
| $SiO_2$ | 6.6% | " |

The product was fine-grained and free-flowing with most of the particles having a grain size between 0.2 and 3 mm. It had an active ingredient content of water-soluble sulfate salts as follows:

| | | |
|---|---|---|
| $Al_2O_3$ | 9.5% | (by weight) |
| $Fe_2O_3$ | 9.0% | " |
| $TiO_2$ | 2.1% | " |

This product could easily be fed into water purification systems by conventional metering equipment and exhibited excellent flocculating action when added to water.

EXAMPLE II

In the reaction pipe 1 of a plant 2.7 m³ of red mud were reacted per hour with 1.85 m³ 96 % sulfuric acid. The water content of the red mud was 45 % by weight. The diameter of the reaction pipe was 150 mm and the length 5 m. The pipe laid about 1 m into the drying kiln 4, that is, the inlet 9 in the accompanying drawing was 1 m long. Owing to the diluting of the sulfuric acid with the water containing in the red mud so much heat was generated, that the reaction began spontaneously. The generated water vapor ejected the reaction mixture into the drying kiln. Means the heat of mixing and reaction 65 % by weight of the amount of water contained in the red mud could been evaporated. The high viscous mixture was passed through a drying rotary kiln with a length of 18 m and a diameter of 2 m. The number of revolutions was 2.5 per minute. The reactions mass was heated with gases flowing countercurrently and was comminuted by the chains of the rotary kiln.

The fine-grained and free-flowing product had at the outlet 8 a temperature of 140° C.

It will be understood that the above description of the present invention is susceptible to various modifications, changes and adaptations, and the same are intended to be comprehended within the meaning and range of equivalents of the appended claims.

We claim:

1. A continuous process for producing freeflowing, particulate flocculating agents from red mud comprising reacting red mud of any desired water content with aqueous sulfuric acid having a strength above 60% and passing the reaction mass with agitation in contact with hot solid bodies and a current of hot gases to simultaneously dry and comminute the reaction mass.

2. A process as set forth in claim 1 wherein the amount of sulfuric acid is selected so that the pH of the reaction mass lies between 1.5 and 2.5.

3. A process as set forth in claim 1 wherein the reaction of the red mud with the sulfuric acid, is substantially completed before the reaction mass is contacted with the heated solid bodies and hot gases.

4. A process as set forth in claim 1 wherein the acid strength is 80–96%.

5. A process as set forth in claim 2 wherein the pH of the reaction mass is between 1.8 and 2.1.

6. A process as set forth in claim 1, wherein the reaction mass is dried and comminuted in a rotary drum kiln.

7. A continuous process for producing free-flowing, particulate flocculating agents from red mud comprising:

reacting red mud as received from the Bayer process for the producton of alumina and having a water content of from 35 to 50% with aqueous sulfuric acid having a strength above 60% to from a reaction mass; and passing the reaction mass with agitation in contact with hot solid bodies and a current of hot gases to simultaneously dry and comminute the reaction mass and form free-flowing, particulate flocculating agents.

8. A process as set forth in claim 7, wherein the amount of sulfuric acid is selected so that the pH of the reaction mass lies between 1.5 and 2.5.

9. A process as set forth in claim 7, wherein the reaction of the red mud with the sulfuric acid is substantially completed before the reaction mass is contacted with the heated solid bodies and hot gases.

10. A process as set forth in claim 7, wherein the acid strength is 80–96%.

11. A process as set forth in claim 8, wherein the pH of the reaction mass is between 1.8 and 2.1.

12. A process as set forth in claim 7, wherein the reaction mass is dried and comminuted in a rotary drum kiln.

* * * * *